(12) United States Patent
Wright et al.

(10) Patent No.: US 6,409,786 B1
(45) Date of Patent: Jun. 25, 2002

(54) FILTER ASSEMBLY

(75) Inventors: Kenneth Wright, Newcastle-upon-Tyne; Brian Lane, Hebburn; Stephen Nicholas Smith, Chester le Street; Paul David Shaw, Sunderland; Alan Bateman, South Hylton, all of (GB)

(73) Assignee: Domnick Hunter Limited, Birtley (GB)

( * ) Notice: Subject to any disclaimer, the term of this patent is extended or adjusted under 35 U.S.C. 154(b) by 0 days.

(21) Appl. No.: 09/581,325

(22) PCT Filed: Dec. 14, 1998

(86) PCT No.: PCT/GB98/03675

§ 371 (c)(1),
(2), (4) Date: Aug. 28, 2000

(87) PCT Pub. No.: WO99/30801

PCT Pub. Date: Jun. 24, 1999

(30) Foreign Application Priority Data

Dec. 15, 1997 (GB) .............................................. 9726418
Jul. 23, 1998 (GB) .............................................. 9815955

(51) Int. Cl.[7] .............................................. B01D 46/24

(52) U.S. Cl. .............................. 55/507; 55/317; 55/322; 55/327; 55/490; 55/509; 55/513; 55/498; 55/502; 55/508

(58) Field of Search .......................... 55/317, 322, 323, 55/327, 490, 493, 498, 502, 507, 508, 509, 513; 210/91, 232, 282

(56) References Cited

U.S. PATENT DOCUMENTS

| 3,675,776 | A | | 7/1972 | Campo |
| 4,063,913 | A | | 12/1977 | Kippel et al. |
| 4,149,974 | A | | 4/1979 | Bolton et al. |
| 4,364,757 | A | * | 12/1982 | Leonatti ...................... 55/509 |
| 4,516,994 | A | | 5/1985 | Kocher |
| 4,668,256 | A | | 5/1987 | Billiet et al. |
| 4,848,989 | A | | 7/1989 | Maeda |
| 5,395,509 | A | | 3/1995 | Cisneros et al. |
| 5,882,367 | A | * | 3/1999 | Morgan et al. ............... 55/502 |
| 6,139,607 | A | * | 10/2000 | Coulonvaux ................. 55/498 |

FOREIGN PATENT DOCUMENTS

| DE | 37 02 205 A1 | 8/1988 |
| DE | 39 09 402 A1 | 9/1990 |
| EP | 0 197 857 A2 | 10/1986 |

(List continued on next page.)

*Primary Examiner*—Duane Smith
*Assistant Examiner*—Minh-Chau T. Pham
(74) *Attorney, Agent, or Firm*—Workman, Nydegger & Seeley

(57) ABSTRACT

A filter assembly for collecting material that is entrained in a gas stream includes a housing having inlet and outlet ports for the gas that is to be filtered. The housing includes an end cap in which at least one of the ports is provided, and a body section in which a tubular filter can be located arranged for the gas stream to flow through its wall provided by a filter medium, the end cap and the body section being separable to allow access to the inside of the housing. A tubular member, which might be a filter element or a conduit for directing a flow of gas to a filter element, can be sealingly connected to the end cap in fluid communication with one of the ports therein. The tubular member includes a tang which can be received in a recess in the housing when the tubular member and the housing end cap are properly assembled.

31 Claims, 5 Drawing Sheets

FOREIGN PATENT DOCUMENTS

| | | |
|---|---|---|
| EP | 0 198 454 A2 | 10/1986 |
| EP | 0 231 862 A2 | 8/1987 |
| EP | 0 278 771 A | 8/1988 |
| EP | 0 547 291 A | 6/1993 |
| EP | 0 578 491 A1 | 1/1994 |
| EP | 0 752 263 A1 | 1/1997 |
| GB | 1 557 946 | 12/1979 |
| GB | 2 126 497 A | 3/1984 |
| GB | 2 250 454 A | 6/1992 |
| GB | 2 261 830 A | 6/1993 |
| GB | 2 295 970 A | 6/1996 |
| GB | 2 307 422 A | 5/1997 |
| WO | WO 88/06228 | 8/1988 |
| WO | WO 90/02597 | 3/1990 |
| WO | WO 94/18387 | 8/1994 |
| WO | WO 96/12547 | 5/1996 |

* cited by examiner

FILTER ASSEMBLY

BACKGROUND OF THE INVENTION

1. Field of the Invention

This invention relates to a filter assembly for collecting material that is entrained in a gas stream such as particulate solid material or liquid in an aerosol form, and to a tubular filter element for location in a housing to collect such material.

2. Present Stated of the Art

Filtration of gas in a compressed gas system is generally required so that the gas is sufficiently clean for a subsequent application or to minimise adverse effects of impurities on components of the system. For example removal of compressor oil can be required to minimise chemical contamination and accumulation on valves which might lead to malfunction of the valves, and removal of particulate solid material can be required to minimise abrasion.

A known filter assembly for use in compressed gas systems is sold by Domnick Hunter Limited under the trade mark OIL-X. It comprises a housing having inlet and outlet ports for the gas stream that is to be filtered, and a tubular filter element which can be located in the housing and is configured for the gas stream to flow through its wall, for example generally outwardly from the inside of the filter element to the outside. When the assembly is used to collect liquid in the gas stream (for example which is carried in the stream as an aerosol), the filter element will cause the liquid to coalesce. Coalesced liquid then drains from the filter element and collects in the housing for discharge. For such applications, the housing will include an outlet for discharge of any collected liquid.

The housing of such a filter assembly comprises a body section in which the tubular filter element is located and in which a reservoir for any collected liquid can be provided, and a head end cap with the inlet and outlet ports for the gas stream. The filter element comprises a filter medium and first and second end fittings by which the filter medium is supported within the housing. The end fitting at the end of the filter element remote from the head end cap is connected to the housing end cap by means of a tie rod which extends through the tubular cavity within the filter element and engages the end cap by means of a thread. The seal between the filter element and the end cap can depend to a degree on the accuracy with which the assembler interconnects the element and the end cap using the tie rod. A less reliable seal might result if for example the threads on the tie rod and the end cap are dirty which restricts mating of the threads. Moreover, the assembler may not be able easily to detect this defect.

BRIEF SUMMARY OF THE INVENTION

The present invention provides a filter assembly in which a tubular member is sealingly connected to a housing in fluid communication a port therein, and bears a resiliently deformable tang which can be received in a recess in the housing when the tubular member and the housing are properly assembled.

Accordingly, in one aspect, the invention provides a filter assembly for collecting material that is entrained in a gas stream, which comprises:

(a) a housing having inlet and outlet ports for the gas that is to be filtered, in which a tubular filter can be located arranged for the gas stream to flow through its wall provided by a filter medium, and (b) a tubular member which can be sealingly connected in fluid communication with one of the ports in the housing, the tubular member bearing at least tang, the housing having a recess in its internal side wall in which the tang can be received when the tubular member is properly located within the housing to form a seal to the said port.

The assembly of the invention has the advantage that the assembler can recognise when a secure connection has been made between the tubular member and the housing once the tang has been received in the recess. Furthermore, by appropriate configuration of the tang and the recess, the location of the tang in the recess can prevent inadvertent or unwanted separation of the housing and the filter element. Accordingly, the invention provides control over the seal that is formed between the housing and the tubular member. This is important to ensure safe and efficient operation of the assembly.

Generally, the housing will comprise an end cap and a body section in which the filter element is located when the assembly is in use. One or more ports for gas to be filtered can then be provided in the end cap; the end cap can then accommodate the flow conduit within it when the assembly is in use to provide a flow path for gas to be filtered between one of the ports and the filter element located in the housing body section. A filter assembly which comprises a housing having a body section and an end cap, with a flow conduit received in the end cap, is disclosed in WO-A-99/30799 (which claims priority from UK patent applications nos. 9726415.4 and 9815959.3 and which has the same filing, priority and publication dates as the present application). Subject matter disclosed in that document is incorporated in the specification of the present application by this reference.

When the housing comprises an end cap and a body section, the assembly of the invention has the advantage of facilitating assembly of the housing. The tang can retain a filter element engaged with the end cap prior to assembly of the end cap and body section of the housing. The operator is therefore able first to assemble together the filter element and the end cap, then to assembly together the body section and the filter element end cap combination.

Preferably, the tang is deformable, especially resiliently, to enable it to be received and located in its recess, especially as the tubular member and the housing are introduced to one another and assembled. Preferably, the tang is arranged so that it is deformed transversely relative to the axis of the filter element. It will generally be deformed transversely inwardly, towards the said axis.

Preferably, the tang includes a projection by which the tang can be depressed to disengage it from the recess. For example, the tang can have first and second projecting portions at or towards its end, arranged at an angle to one another. The first of the projecting portions can be received in the recess and the second projecting portion can be used to depress the tang to disengage the first projecting portion from the recess.

The tubular member can be provided with more than one tang, for example two, three four or more tangs. The arrangement of the tangs around the tubular member will be arranged to match that of the recesses in the housing. Often, when there are a plurality of tangs, they will be arranged with uniform spacing around the tubular member. Different arrangements of tangs and recesses can be used to differentiate products, for example because of different technical specifications, to ensure that a tubular member is always used in an appropriate housing.

The tubular member is in fluid communication with one or more inlet ports or one or more outlet ports in the housing, providing a path for flow of the stream of the gas that is to be filtered between the port(s) and tubular cavity within the filter element that is defined by the filter medium.

Preferably, the recess is provided in the housing so that location of the tang in the recess can provide an indication that the tubular member has been located in the housing.

Preferably, the recess has an associated ramp portion to cause the tang to be deformed as the tang approaches the recess during introduction of the tubular member into the housing. Generally, the ramp is arranged facing along the axis of the filter element so that the tang is deformed when the tubular member is moved along the axis of the assembly. Other configurations of ramp will be appropriate if the movement of the tubular member into the housing involves other movement such as rotation.

Generally, the flow of the gas stream towards and away from the assembly will be generally horizontal. The tubular filter element will generally be arranged vertically so that the port referred to above is arranged at the top of the housing, with the filter element depending below it. The inlet and outlet ports for the gas to be filtered can be provided in an end cap located at the top of the housing; the end cap can be referred to as the head end cap. The element is preferably supported at or towards the end that is remote from the housing port (and the head end cap when the housing comprises an end cap and a body section), especially by means of a support which extend between the filter medium and the side wall of the housing. When the support extends between the side wall of the housing and an end fitting on the filter element, that end fitting will be the bottom end fitting.

The filter element will generally comprise a filter medium and first and second end fittings. Preferably, the support for the filter element is provided on one of the end fittings. In particular, it can be preferred for the support and the end fitting to be provided as a single component, possibly as a result of being formed together for example as a one-piece moulding, or as a result of being connected to one another for example mechanically, or by bonding (with or without an adhesive material).

Preferably, the support extends from its end fitting towards the side wall of the housing generally transversely relative to the longitudinal axis of the filter element. For example the angle between the support and the said axis can be at least about 45°, preferably at least about 60°, more preferably at least about 75°, and possibly 90° or more for some applications when the support will be approximately perpendicular to the axis. When the angle between the support and the axis is less than 90°, it will generally be preferred for the support to be inclined in a direction away from the port in the housing (which will be in the end cap when the housing comprises an end cap and a body section). This has the advantage of enhancing the ability of the support to withstand force exerted by pressurised gas supplied to the housing. Preferably, the housing has an internal support surface on which the support rests when the filter element is properly located within the housing. The support surface can face axially in the housing, towards the end of the housing from which the filter element is inserted into the housing. Accurate positioning of the support surface can ensure that the seal between the filter element and the housing is formed reliably when the filter element is connected to the housing. It can also ensure that a reliable seal is formed between the element and the housing when the body section and the head end cap of the housing are connected to one another.

Preferably, the support comprises at least three limbs which extend between the filter medium and the side wall of the housing. As a result, the filter element is supported stably within the housing, both along and transverse to its axis. The limbs will preferably be narrow when viewed along the axis of the element especially when the filter element is intended to operate in an in-to-out mode in order to minimise accumulation of any coalesced liquid at the base of the filter element. The limbs might include stiffening ribs to enhance their ability to withstand axial loads which might tend to cause them to flex or break. The length and width of the limbs might be such that the limbs appear elongate when viewed along the axis of the filter when they are longer measured transverse to the axis than they are wide measured tangentially to the axis. They might instead have the form of short tabs or tangs when they are shorter measured transverse to the axis than they are wide measured tangentially to the axis. Details of a support on an end fitting of a filter element are disclosed in WO-A-99/30800 (which claims priority from UK patent applications nos. 9726418.8 and 98154955.1 and which has the same filing priority and publication dates as the present application). Subject matter disclosed in that document is incorporated in tie specification of the present application by this reference.

It can be preferred for the housing to comprise a body section and a base end cap, in which the support surface on which the support rests is provided on the base and cap. Preferably, the support surface on which the support rests is provided at about the interface between the body section and the base end cap. For example, the support surface might be provided on the base end cap at about the interface with the body section, for example in the form of a shoulder or ledge, provided by an end surface or on an internally projecting rib or a recess.

The support surface can be configured to provide positive location of the support, for example to prevent or at least to restrict rotation of the support relative to the housing. Often, the support surface will be continuous around the perimeter of the housing, for example in the form of a ledge.

When the filter assembly is intended for use in applications in which liquid impurities are to be collected, the housing preferably includes an outlet for liquid entrained in the gas stream which coalesces in the filter element. The housing can include a separable base end cap which defines a reservoir into which coalesced liquid can drain from the filter element and which has a valved outlet for discharge of collected liquid from the housing. The reservoir within the housing can provide a "quiet region" in which liquid can collect without excessive turbulence, so that re-entrainment of the liquid is minimised. Preferably, the body section and the base end cap are both open at the interface between them so that the base end cap closes the housing at its lower end. A valved outlet for coalesced liquid can be provided in the base end cap. The reservoir can be made from a material that is transparent. The provision of a reservoir in a separable end cap has the advantage of ready access to the interior of the housing at its lower end, for example for inspection of the element or for inspection, cleaning or replacement of the reservoir or any valve located within it. The body section and the base end cap can both be open at the interface between them so that the base end cap closes the housing at its lower end.

When the housing comprises a separable base end cap, the body section of the housing can be formed with a substantially constant cross-section along its length. This allows the body section to be formed by extrusion. This has the advantages of convenience and of allowing the length of the body section to be selected easily to fit an appropriate filter element. Furthermore, the body section can be formed with formations such as ribs or grooves in its wall extending along its length. Details of a housing which with a body section having a constant cross-section and separable end caps are disclosed in WO-A-99/30803 (which claims priority from UK patent applications nos. 9726419.6 and 9815963.5 and which has the same filing, priority and publication dates as the present application). Subject matter that is disclosed in that document is incorporated in the specification of the present application by those references. Details of a housing whose body has a constant cross-section, with a longitudinally extending internal formation and a communicating transverse formation, are disclosed in WO-A-99/30802 (which claims priority from UK patent applications nos. 9726419.6 and 9815957.7 and which has the same filing priority and publication dates as the present application). Subject matter that is disclosed in that document is incorporated in the specification of the present application by those references.

The filter medium will be selected according to the requirements on the assembly when in use, for example in terms of the nature and quantity of the impurity (for example as to whether it comprises liquid impurity or solid impurity or both) in the gas stream, the degree of filtration required of the medium, the pressure to which the assembly is exposed when in use. When the impurity to be collected includes liquid (which will generally be present as an aerosol for example of compressor oil), the filter medium will preferably be capable of causing liquid droplets to coalesce. Materials suitable for use in a coalescing filter element are known, including those sold by Domnick Hunter Limited under the trade mark OIL-X. Suitable materials include borosilicate and other glass fibres, activated carbon materials, activated silica materials and so on.

Preferably, the housing comprises a head end cap and a body section which can be separated to allow access to the interior of the housing, the support for locating the filter element being provided on the end of the filter element that is remote from the head end cap. When the head end cap and the body section are separated, a filter element within the housing can be inspected and replaced if necessary.

It is preferred that the assembly includes a flow conduit which can be fitted into the end cap, with one end sealed to a port in the end cap, for directing the flow of gas between a port in the head end cap and the filter medium, especially the tubular cavity within the filter element defined by the filter medium. The connection between the flow conduit and the end cap might be temporary when separation of the end cap and the flow conduit is required or it might be substantially permanent. The use of a flow conduit which is fitted into the housing end cap has the advantage that the flow conduit can be made with a configuration that is not restricted by having to be formed as an integral part of the end cap. For example, when the axes of the openings at the opposite ends of the conduit are not aligned, the flow path between the openings can be configured to present a continuous smooth flow path to the gas stream flowing along it between the first and second conduit openings. The smooth flow path can be constructed to reduce restriction of the flow of the gas stream compared for example with a flow conduit which presents a discontinuous flow path which is sharply angled or contains steps or other obstructions. The flow conduit can be made with additional features during its manufacture. For example, a port might be formed in it for connection to means for indicating the pressure within the conduit. A tang might be formed on the flow conduit which can be received in a recess in the housing when the flow conduit is properly located within the housing end cap. This can provide an indication that the flow conduit is properly located, for example by visual inspection or as a result of the tang received in the recess, especially when resiliently deformable so that it can be received in the recess with a snap fit. The flow conduit can be located in its appropriate position within the end cap by means of interengaged ribs on the flow conduit and the end cap respectively. Details of a filter assembly with a separable flow conduit are disclosed in WO-A-99/30798 (which claims priority from UK patent applications nos. 9726415.4 and 9815964.9 and which has the same filing, priority and publication dates as the present application). Subject matter disclosed in that document is incorporated in the specification of the present application by this reference.

The tubular member in the assembly of the invention can be a flow conduit for directing the flow of gas between the filter medium and a port in the housing, especially the tubular cavity within the filter element defined by the filter medium. The flow conduit can have first and second openings which communicate with the port in the housing and the filter element respectively, in which the axes of the first and second conduit openings are not aligned.

When the housing comprises a head end cap and a body section, the filter element is located largely within the body section of the housing. Generally, the connection to the filter element for the flow of gases is made at about the interface between the body section and the housing head end cap. However, the filter element might protrude beyond the end of the body section or the body section might extend beyond the end of the filter element. The housing body section and the or each end cap should be capable of being connected to one another with sufficient security to withstand internal pressures to which the assembly is subjected when in use. Examples of appropriate connections include threaded and bayonet type connections. Preferably, the assembly includes means for indicating when the end cap and the body section are connected to one another sufficiently securely to withstand the internal pressures. This can have the advantage of also indicating that the low conduit is appropriately located in the housing (whether or not the housing comprises an end cap and a separable body section), for example when the flow conduit engages the body section (directly or indirectly) and it is through the action of the body section on the flow conduit that the flow conduit is forced into the housing end cap. The indication can be visual, for example involving the appearance of a marking in the housing or the flow conduit. The indication can be sensed in other ways, for example by feeling engagement of a resilient member in a recess. The indication means can be provided by the combination of the tang and the recess, whether detected visually or by feel or in some other way. For example, one of the flow conduit and the housing can bear a resiliently deformable tang and the other of the flow conduit and the housing can have a recess formed in it in which the tang is received when the flow conduit is properly located within the housing. In a preferred embodiment, the tang is provided on the flow conduit and the recess is provided in the housing, preferably the housing end cap.

Preferably, the end fittings for the filter element are made from a polymeric material such as a polyolefin, a polyamide, or a polyester. The polymeric material can be reinforced for example by fibres. The use of a polymeric material for the end fittings has the advantage that it can conveniently be formed by a moulding process, with the flow conduit or the support for the filter element according to the design of the filter element for any particular application.

Preferably, the housing is formed from a metallic material such as a steel or an aluminium alloy, in particular to enable the housing to withstand the internal pressures to which it is exposed when in use. Polymeric materials can however be appropriate for many applications, for example when the filter assembly is only to be exposed to moderate pressures in use or has a small size. The metallic or polymeric components can be made by a casting or moulding process although, as mentioned above, extrusion can be preferred if the body section has a constant cross-section.

Preferably, the housing (especially the head end cap thereof) has at least three ports which are to provide between them the inlet and outlet for the gas that is to be filtered. The provision of at least three ports can enable selection of the relative orientation of the inlet and the outlet by selection of the ports in the housing that are to provide the inlet and the outlet respectively. The selection of ports can be achieved by location of a flow conduit within the housing, appropriately aligned with the selected port or ports. The plurality of ports can also allow the assembly to function as a manifold for combining or separating gas streams. The assembly can include an adaptor block having formations in it by which a connection can be made to another component (such as a closure cap for sealing the port against flow of gas, a conduit for the flow of gas to or from the filter assembly, or a connector by which the housing can be connected to a similar port on the housing of another filter assembly), the block and the housing being capable of being sealingly connected to one another with the block located adjacent to one of the ports of the housing to provide for flow of the gas stream between the said other component and the said port.

Generally, the flow conduit between the internal cavity in the filter element and a port in the housing (whether or not it is separable from the housing) will provide a path for the gas stream to flow between the inlet in the housing and the tubular cavity within the filter element for the gas to flow outwardly through the filter medium provided in wall of the element so that the filter element functions in an in-to-out mode. Alternative arrangements are envisaged. For example, the flow conduit can provide a path for the gas stream to flow between the tubular cavity within the filter element and the outlet in the housing after the gas has flowed inwardly through the filter medium, so that the filter element functions in an out-to-in mode.

The assembly of the invention will include the filter element when the assembly is in use. The filter element comprises a tubular body of filter medium and first and second end fittings by which the filter medium is supported within the housing. A flow conduit or the support or both can be provided as part of the end fittings of the filter element, especially when the end fitting (including the flow conduit or the support) is formed by a moulding operation.

The tubular member can be the filter element of the assembly, comprising first and second end fittings having the tubular wall provided by the filter medium located between them, and in which the tang is provided on the first of the end fittings. When the assembly includes a flow conduit, it can be separable from the end cap or the filter element or both. A flow conduit can be provided can be provided on the same end fitting of the filter element as the tang.

In another aspect, the invention provides a tubular filter element for location in a housing to collect material that is entrained in a gas stream by passing the gas stream through the wall of the element, which comprises a filter medium and first and second end fittings by which the filter element can be located within a filter housing when in use, the first end fitting bearing a tang which, when the connection is formed, can be received in a recess in the housing.

Preferably, the tang can be deformed resiliently during formation of a connection between the filter element and a housing, and the recess allows the configuration of the tang to be restored at least partially towards its undeformed configuration.

BRIEF DESCRIPTION OF THE DRAWINGS

The present invention will now be described, by way of example only, with reference to the accompanying drawings, in which.

DETAILED DESCRIPTION OF THE PREFERRED EMBODIMENT

Figure 1:
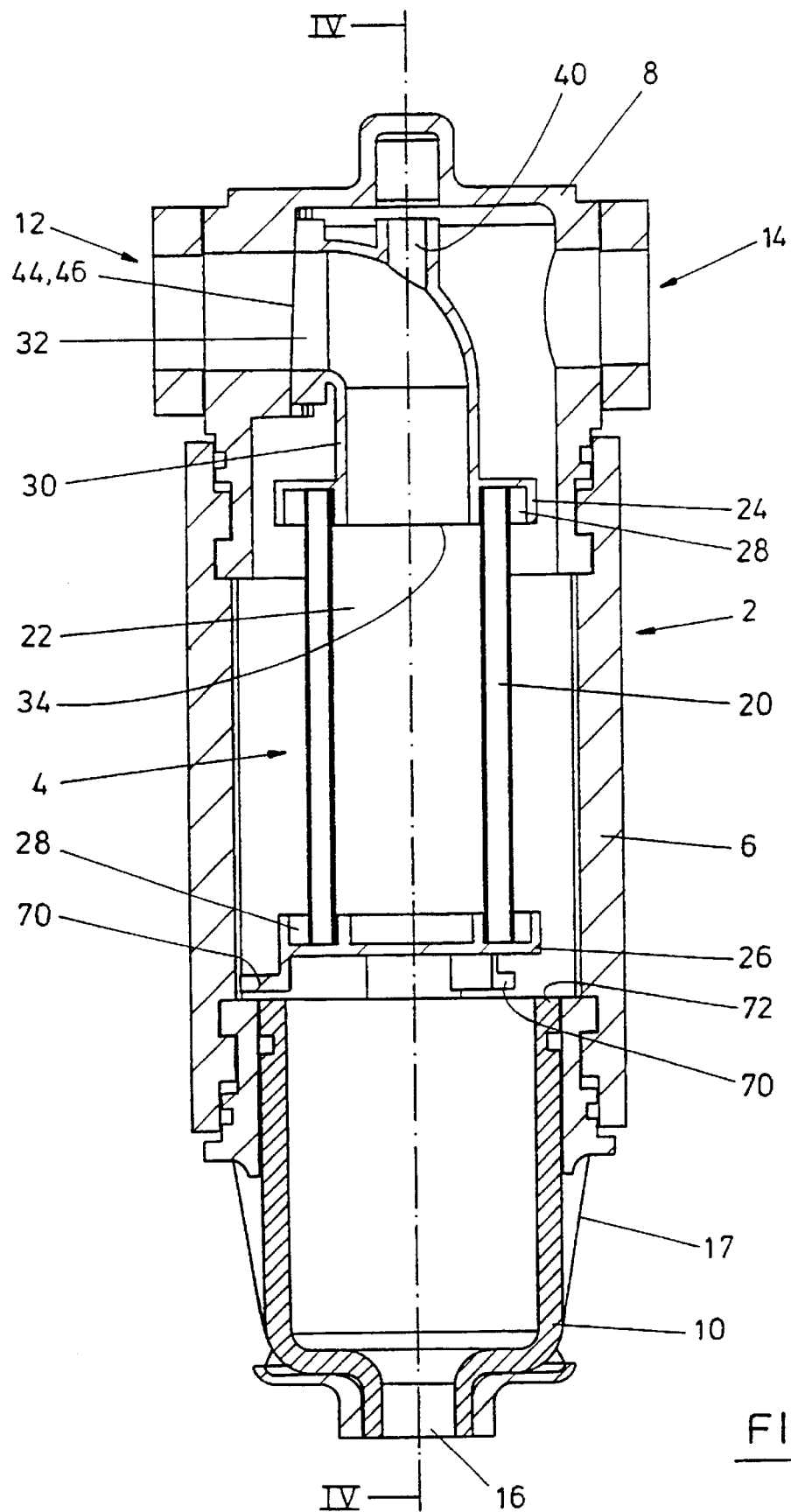
FIG. 1 is a sectional side elevation through a filter assembly according to the invention.
Figure 2:
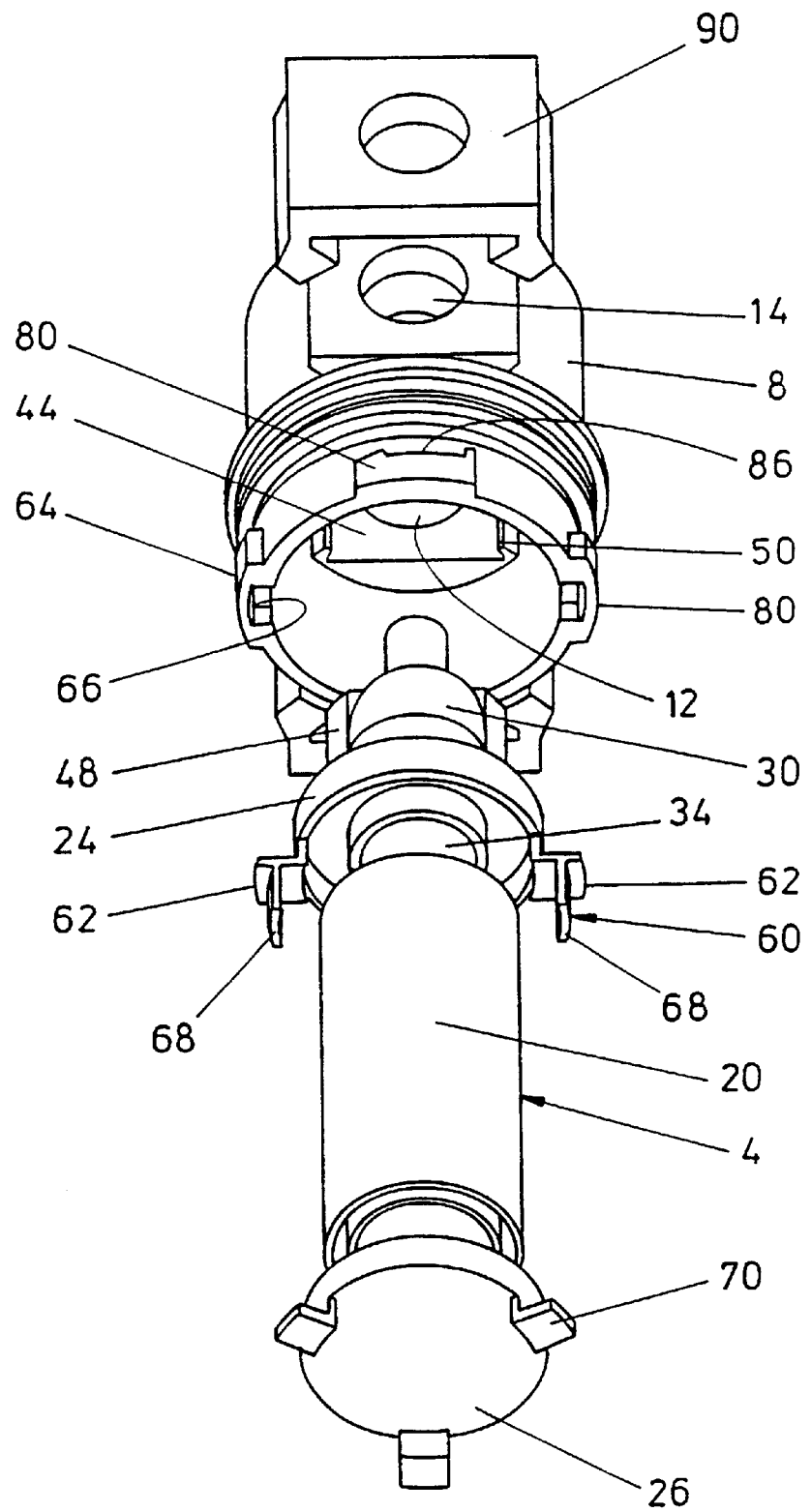
FIG. 2 is an exploded view from below of the filter element and head end cap of the housing of the assembly.
Figure 3:
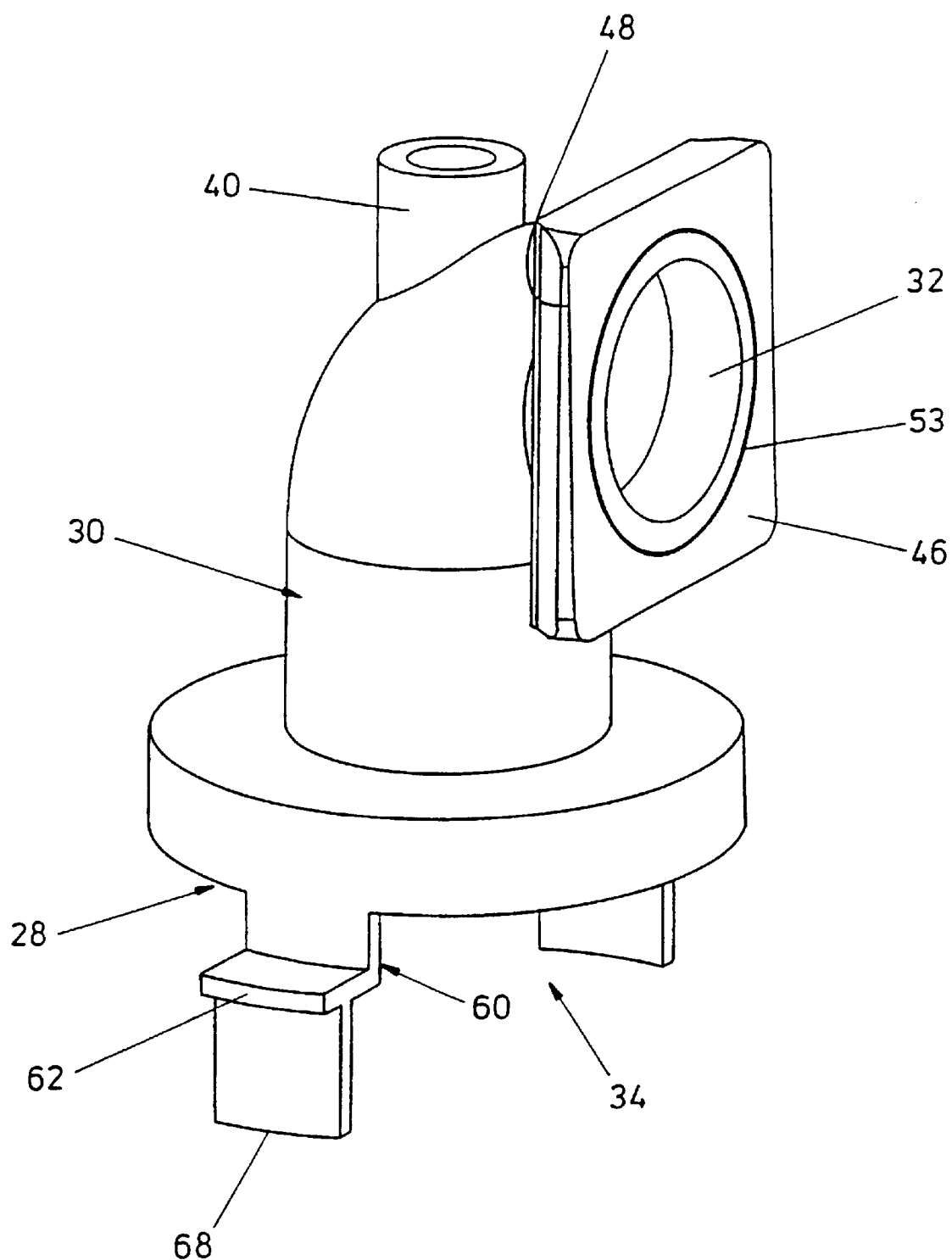
FIG. 3 is an isometric view of the flow conduit of the assembly.

Referring to the drawings, the assembly of the invention comprises a housing 2 and a filter element 4. The housing consists of a body section 6 and head and base end caps 8, 10. The filter element is located wholly within the body section 6 of the housing with the ends of the body section extending beyond the ends of the filter element.

The head end cap 8 contains an inlet port 12 and an outlet port 14 for a gas that is to be filtered. When the assembly is to be used to collect liquid in a gas stream, the base end cap 10 can provide a reservoir, and can contain an outlet 16 for liquid that has collected in the assembly. It can conveniently be made from a transparent material so that the level of liquid within it can be inspected. It can include a protective cage for the reservoir.

The filter element 4 comprises a cylindrical wall section 20 formed from a filter medium and top and bottom end fittings 24, 26. The wall section defines a cavity 22 within it. The material of the filter medium will be selected according to the nature of the gas to be filtered and the material in it that is to be filtered. When the gas to be filtered contains aerosol droplets of liquid contaminant, the filter medium will be selected to cause the liquid to coalesce. The coalesced liquid within the filter medium will drain through the filter medium and from the filter element. Each of the end fittings has a trough 28 formed in it in which the wall section 20 is received and sealed so as to ensure that flow of fluid through the filter element takes place through the filter medium.

In use, a gas that is to be filtered enters the housing 2 through the inlet port 12 in the head end cap 8 and is directed to the internal cavity 22 within the filter medium by means of a flow conduit 30. The gas flows outwardly through the filter medium. Any liquid in the gas stream can be coalesced within the filter medium. Any solid particles within the gas stream can also be collected by the filter element.

Gas that has passed through the filter medium is discharged from the assembly through the outlet port 14 in the head end cap 8.

The description above applies to the filter assembly when operated in an in-to-out mode. As discussed above, the assembly can instead be configured for use in an out-to-in mode. In each case, connections to the housing end cap for the flow of fluid can be made by means of an adaptor block 90 which can be fitted to the housing head end cap 8 and which bears appropriate formations to make a secure connection to a conduit for the fluid to be filtered or other component.

The head end cap 8 contains the flow conduit 30 by which the flow of gas between the inlet port 12 in the head end cap and the internal cavity 22 within filter medium 20 is directed. The flow conduit 30 has a first conduit opening 32 which is sealed to the inlet port 12, and a second conduit opening 34 which communicates with the internal cavity 22 within the filter medium. In the illustrated embodiment, the angle between the axes of the two openings is about 90°. The flow conduit 30 is gently curved and presents a smooth flow path for a gas stream flowing between the two openings. The flow conduit has a port 40 in it for connection to a gauge for measuring the differential pressure across the filter element. The flow conduit 30 can be formed with its curved shape and integral port and other features by a moulding process, especially when it is formed from polymeric material. The flow conduit can be formed as a one-piece moulding with the top end fitting 24 of the filter element 4.

The inlet port 12 in the head end cap and the corresponding face of the flow conduit present mating planar internal surfaces 44, 46. The opposite edges of the surface 46 on the flow conduit present a pair of ribs 48 which are received between a corresponding pair of ribs 50 presented by the surface 44 on the end cap to retain the sealing surfaces in contact with one another. The ribs 48 on the flow conduit and the ribs 50 on the end cap are aligned with the axis along which the flow conduit is introduced into the housing end cap so that the two sets of ribs engage one another as the flow conduit is introduced. The ribs are tapered so that they have a wedge shape when viewed from the side to ensure that the mating sealing surfaces 44, 46 on the flow conduit and the housing head end cap are forced together as the flow conduit is introduced into the end cap, to enhance the seal between the surfaces. A sealing gasket 52 is provided in a groove on the surface 46 of the flow conduit around the first conduit opening 32, which is compressed between that surface and the surface 44 on the end cap. The port 40 can be received in a downwardly facing socket in the end cap, forming a seal by compression of a gasket between the internal surface of the socket and the external surface of the port.

Figure 4:
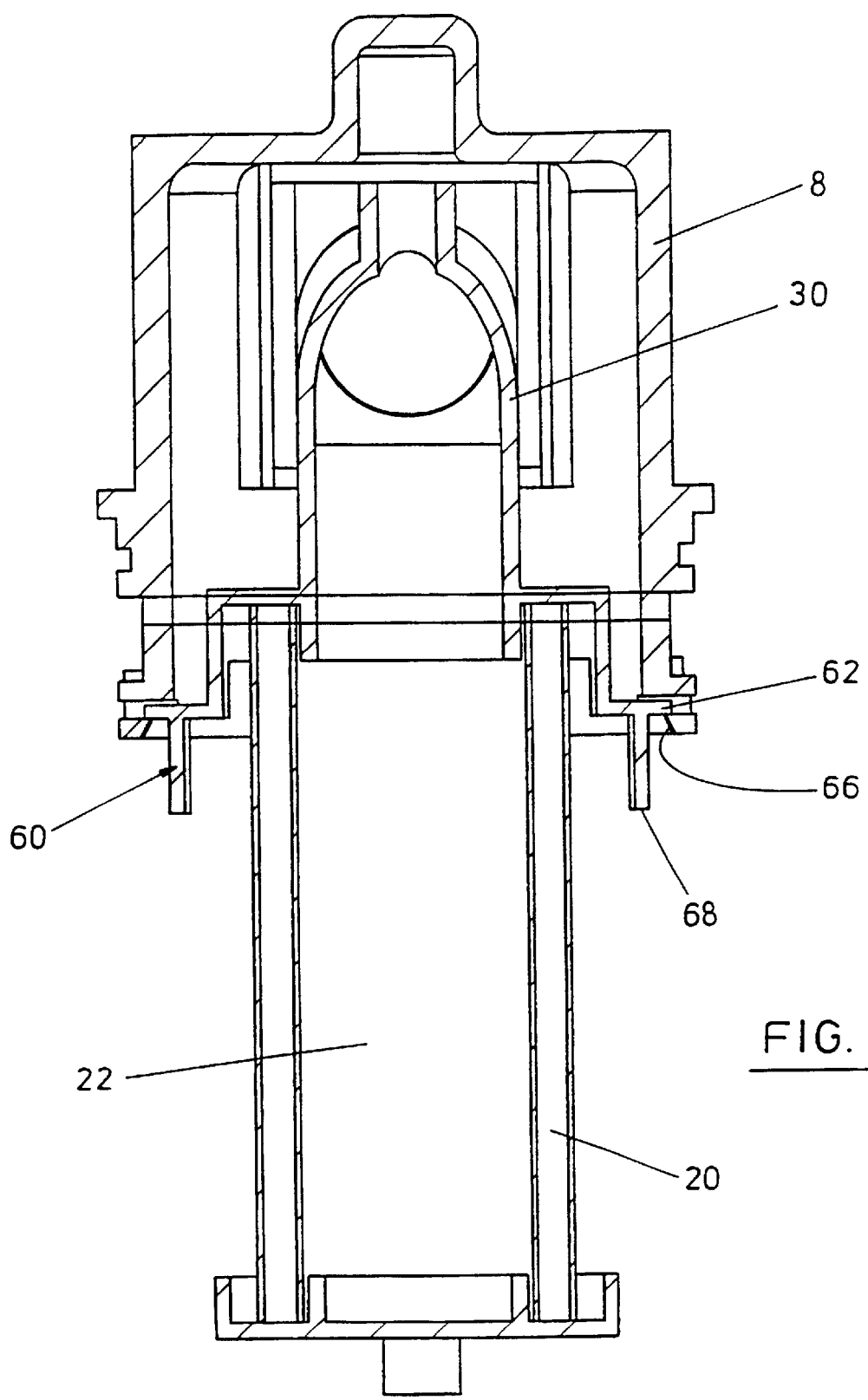
FIG. 4 is a sectional elevation through the head end cap and flow conduit of the assembly on the line IV—IV.

The flow conduit 30 bears two downwardly extending deformable tangs 60. Each tang has an outwardly projecting limb 62 which can be received in a slot 64 in the housing end cap 8 when the flow conduit is properly located in the end cap, as shown in FIG. 4. Location of the limb 62 in the slot 64 is facilitated by a tapered ramp 66 to the slot, causing the tang to be deformed inwardly before springing back into the slot. Once located in the slot, the limb can retain the flow conduit within the end cap, at least until other components of the assembly have been introduced. The tang 60 also includes a downwardly extending projection 68 by which the tang can be deformed inwardly to release the limb 62 from the slot, allowing the flow conduit to be released from the end cap.

The bottom end fitting 26 includes three transversely extending limbs 70 which extend between the filter medium 20 and the internal wall of the housing. The limbs engage a support surface in the form of an upwardly facing ledge 72 on the base end cap 10 of the housing. When the assembly is assembled with head and base end caps connected to the body section 6 of the housing and the flow conduit 30 within the head end cap, the support provided for the filter element by the limbs 70 acting on the base end cap retains the flow conduit within the head end cap 8, against the downward force resulting from the differential pressure across the filter medium.

Figure 5:
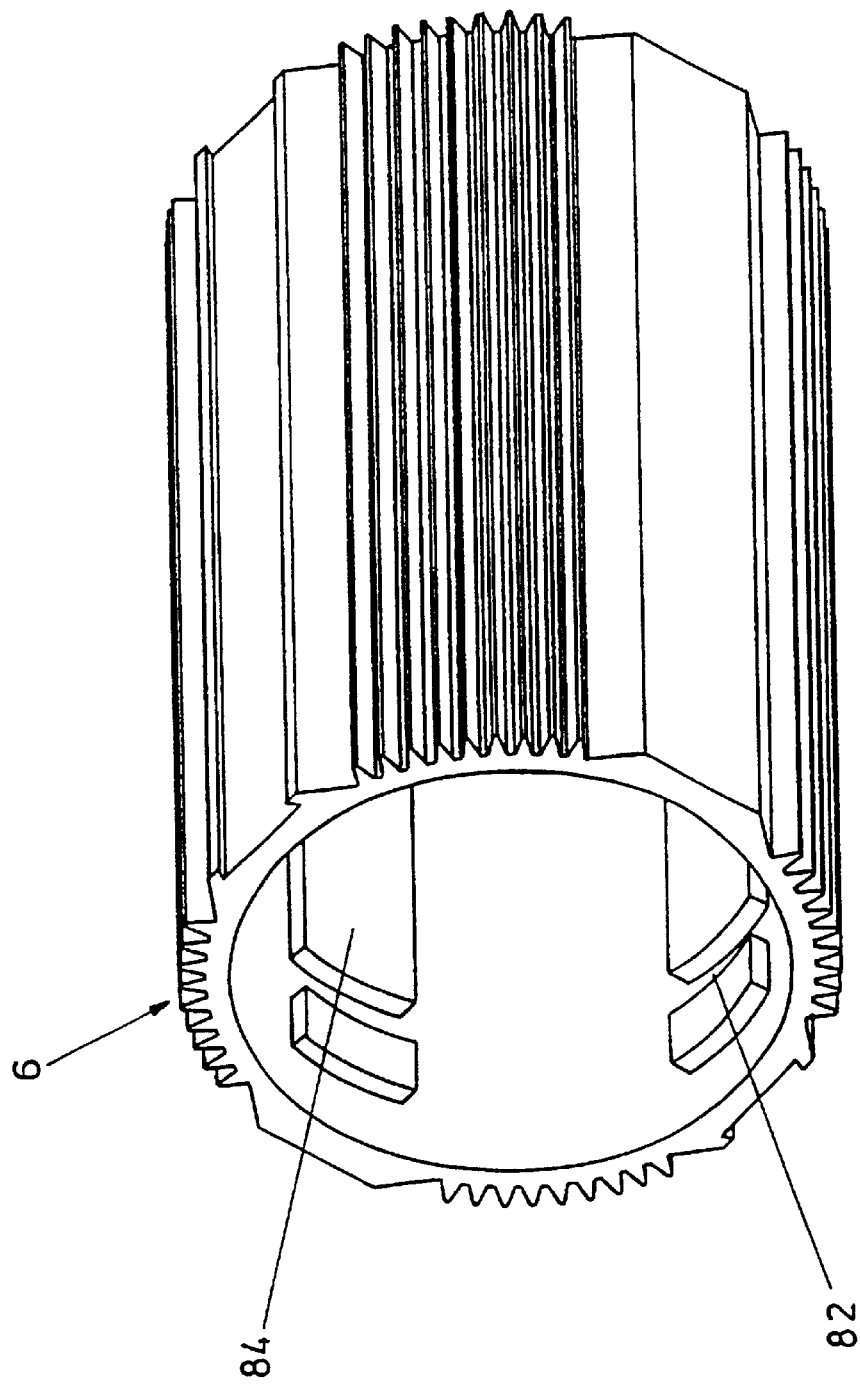
FIG. 5 is an isometric view of the body section of the assembly.

The connections between the head end cap 8 and the body section 6 of the housing can be made by a bayonet arrangement in which four orthogonally arranged lugs 80 on the end cap which are received in transverse grooves within the body section. As can be seen in FIG. 5, each groove 82 is formed in one of four longitudinally extending ribs 84. A detent 86 on at least some of the lugs 80 can retain the lugs and grooves together, preventing inadvertent rotation which would release the end cap from the body section. A similar arrangement of lugs and grooves can be used to form a connection between the base end cap and the body section.

Appropriate seals will be provided between the components of the housing to prevent unwanted loss of pressure.

What is claimed is:

1. A filter assembly for collecting material that is entrained in a gas stream, which comprises:
   (a) a housing having inlet and outlet ports for the gas that is to be filtered, which comprises an end cap in which at least one of the said ports is provided, and a body section in which a tubular filter element can be located arranged for the gas stream to flow through its wall provided by a filter medium, the end cap and the body section being separable to allow access to the inside of the housing, and
   (b) a tubular member which can be sealingly connected to the end cap in fluid communication with one of the ports therein, the tubular member bearing a resiliently deformable tang,
the housing having a recess formed thereon in which the tang can be received when the tubular member and the housing end cap are properly assembled, the reception of the tang in the recess involving resilient deformation of the tang during formation of a connection between the tubular member and the housing, the recess allowing the configuration of the tang to be restored at least partially towards the undeformed configuration.

2. A filter assembly as claimed in claim 1, in which the recess is provided in the housing end cap.

3. A filter assembly as claimed in claim 1, in which the resiliently deformable tang includes a projection which can be manually depressed to disengage the tang from the recess.

4. A filter assembly as claimed in claim 1, in which the filter element forms a tubular cavity and the tubular member comprises a flow conduit which fits into the housing end cap for directing the flow of gas between the said port in the end cap and the tubular cavity within the filter element.

5. A filter assembly as claimed in claim 4, in which the flow conduit has first and second openings which communicate with the port in the end cap and the filter element respectively, and in which the axes of the first and second conduit openings are not aligned.

6. A filter assembly as claimed in claim 5, in which the flow conduit presents a continuous smooth flow path for gas flowing along the flow conduit between the first and second conduit openings.

7. A filter assembly as claimed in claim 4, in which the flow conduit is held in place in sealing engagement with the port in the end cap by means of interengaging ribs on the flow conduit and the end cap respectively.

8. A filter assembly as claimed in claim 7, in which the flow conduit has a flange thereon whose opposite edges present a pair of ribs which are received between a corresponding pair of ribs on the end cap to retain the flow conduit within the end cap.

9. A filter assembly as claimed in claim 7, in which the flow conduit is urged into sealing engagement with the port in the end cap progressively as the flow conduit is introduced into the end cap.

10. A filter assembly as claimed in claim 4, in which the flow conduit can be disengaged from the end cap as a one-piece assembly with the filter element.

11. A filter assembly as claimed in claim 10, in which the filter element comprises a first and second end fittings which have the tubular wall provided by the filter medium located between them, and in which the flow conduit is provided on the first of the end fittings.

12. A filter assembly as claimed in claim 11, in which the flow conduit is moulded integrally with the end fitting.

13. A filter assembly as claimed in claim 4, in which the flow conduit has a trough at the end which is open in the direction facing towards the filter element, in which the end of the filter medium can be received.

14. A filter assembly as claimed in claim 1, in which the tubular member is a filter element which comprises a first and second end fittings having the tubular wall provided by the filter medium located between them, and in which the resiliently deformable tang is provided on the first of the end fittings.

15. A filter assembly as claimed in claim 14, which includes a conduit for directing the flow of gas between one of the ports in the end cap and the tubular cavity within the filter element, the conduit being located in the end cap of the housing and separable from the said end cap.

16. A filter assembly as claimed in claim 14, which includes a conduit for controlling flow of gas between one of the ports in the end cap and the tubular cavity within the filter element through the first end fitting, the conduit being located in the end cap of the housing and separable from the first end fitting of the filter element.

17. A tubular filter element for location in a housing to collect material that is entrained in a gas stream by passing the gas stream through the wall of the filter element, the tubular filter element comprising:
   a wall comprising a filter medium;
   first and second end fittings by which the filter element can be located within a filter housing when in use; and
   a tang disposed on the first end fitting which, when the connection is formed, can be received in a recess in the housing, the tang being resiliently deformable transversely relative to the axis of the filter element to enable the tang to be inserted into the recess in the housing when the filter element is inserted into the housing in a direction along the axis of the filter element, the engagement of the tang in the recess resisting separation of the filter element and the housing when the tang is restored towards an undeformed configuration in the recess in the housing.

18. A filter element as claimed in claim 17, in which the first end fitting includes a flow conduit for directing the flow of gas between the filter medium and a port in a housing in which the element is to be located in use.

19. A filter element as claimed in claim 18, in which the wall of the filter element forms an internal cavity and the axis of the flow conduit opening which communicates with the housing port and the axis which communicates with the internal cavity in the filter element are not aligned.

20. A filter element as claimed claim 18, in which the flow conduit and the first end fitting of the filter element are such that they can be removed from a filter assembly housing as a one-piece assembly.

21. A filter element as claimed in claim 20, in which the flow conduit is formed as a one-piece moulding with the first end fitting.

22. The filter element as recited in claim 17, wherein the tang comprises:
   a first projecting portion outwardly extending from the first end fitting, the first projecting portion having a side surface extending between a first end and an opposing second end; and
   a second projecting portion extending from the side surface of the first projecting portion, the second projecting being manually depressible to deform the first projecting portion.

23. A filter assembly for collecting material that is entrained in a gas stream, the filter assembly comprising:
   a housing having an interior surface defining a chamber, a recess being formed on the interior surface of the housing, the housing comprising a hollow body portion and a first end cap selectively mounted on the body portion, an inlet port and an outlet port being formed on the housing in communication with the chamber, at least one of the inlet port and the outlet port being formed on the first end cap;
   a tubular filter removably disposed within the chamber of the housing;
   a tubular member removably disposed within the chamber of the housing between the first end cap and the tubular filter, the tubular member providing fluid communication between the tubular filter and the at least one of the inlet port and the outlet port formed on the first end cap; and
   a first tang at least partially outwardly projecting from tubular member, the first tang being resiliently deformable so as to enable selective reception of the first tang into the recess on the interior surface of the housing, thereby securing the tubular member to the housing.

24. The filter assembly as recited in claim 23, wherein the first tang comprises:
   an outwardly extending first projecting portion having a side surface extending between a first end and an opposing second end, the second end of the first projecting portion being received within the recess of the housing; and
   a second projecting portion extending from the side surface of the first projecting portion.

25. The filter assembly as recited in claim 24, where the second projecting portion of the first tang is configured such that depressing of the second projecting portion disengages the first projection from the recess of the housing.

26. The filter assembly as recited in claim 23, further comprising a second tang at least partially outwardly projecting from tubular member at a spaced apart location from the first tang.

27. The filter assembly as recited in claim 23, wherein the recess is bounded by an upper boundary and a lower boundary, the lower boundary having a ramp portion which causes the first tang to bend as the first tang approaches the recess during assembly of the tubular member to the housing.

28. The filter assembly as recited in claim 23, wherein the recess is formed on the first end cap.

29. The filter assembly as recited in claim 23, further comprising a second end cap selectively mounted to the end of the body portion opposite the first end cap.

30. A filter assembly as recited in claim 23, wherein the inlet port and the outlet port are both formed on the first end cap.

31. A filter assembly as recited in claim 23, wherein the tubular filter is a discrete element from the tubular member.

* * * * *

UNITED STATES PATENT AND TRADEMARK OFFICE
CERTIFICATE OF CORRECTION

PATENT NO. : 6,409,786 B1  Page 1 of 1
DATED : June 25, 2002
INVENTOR(S) : Kenneth Wright et al.

It is certified that error appears in the above-identified patent and that said Letters Patent is hereby corrected as shown below:

<u>Column 4,</u>
Line 17, before "are" change "clement" to -- element --

<u>Column 6,</u>
Line 28, after "extend" change "bcyond" to -- beyond --

Signed and Sealed this

Eighteenth Day of February, 2003

JAMES E. ROGAN
*Director of the United States Patent and Trademark Office*